Sept. 9, 1924.
O. C. SANDERS
HORSESHOE CALK
Filed Oct. 17, 1923
1,508,129
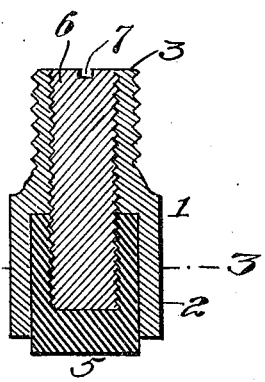
*Fig. 1.*
*Fig. 4.*
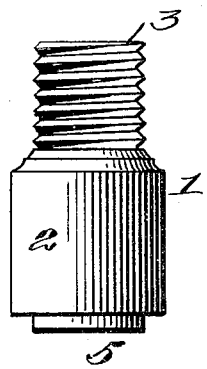
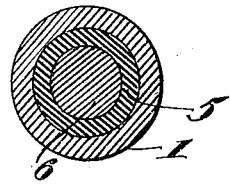
*Fig. 2.*
*Fig. 3.*
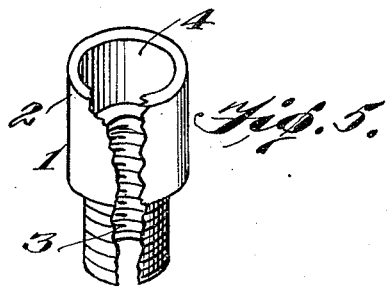
*Fig. 5.*
INVENTOR.
Oscar C. Sanders
BY
ATTORNEYS.

Patented Sept. 9, 1924.

1,508,129

UNITED STATES PATENT OFFICE.

OSCAR C. SANDERS, OF GALWAY, NEW YORK.

HORSESHOE CALK.

Application filed October 17, 1923. Serial No. 669,141.

*To all whom it may concern:*

Be it known that I, OSCAR C. SANDERS, a citizen of the United States, residing at Galway, in the county of Saratoga and State of New York, have invented certain new and useful Improvements in Horseshoe Calks, of which the following is a specification, reference being had therein to the accompanying drawings.

This invention relates to a horseshoe calk, and the object of the invention is the construction of a simple and efficient calk that will prevent horses from slipping on wet and icy pavements.

With the foregoing and other objects in view, my invention comprises certain novel combinations, constructions, and arrangements of parts as will be hereinafter described, illustrated in the accompanying drawings, and more particularly pointed out in the appended claim.

In the drawings:

Figure 1 is a vertical central sectional view of a calk constructed in accordance with the present invention, while Fig. 2 is a view in side elevation of the same;

Fig. 3 is a sectional view, taken on line 3—3, Fig. 1;

Fig. 4 is a perspective view of the rubber section, partly shown in section; and Fig. 5 is a perspective view of the outer steel shell, partly shown in section.

Referring to the drawings by numerals, 1 is the outer steel shell comprising preferably a cylindrical body 2 and a reduced stem 3. The stem 3 is threaded both internally and externally (Fig. 1). The stem 3 is adapted to be threaded into a suitable aperture in the body of an ordinary horseshoe, thereby attaching my calk device to the shoe.

The body 2 of shell 1 is provided with a recess 4 for receiving the rubber section 5. The rubber section 5 is closed at its outer end and open at its inner end and is internally threaded for receiving the lower or inner end of the anchor section 6. The anchor section 6 is externally threaded throughout its entire length so that when it is screwed into stem 3 and into the rubber section 5, it will securely anchor or hold the rubber section within the shell 1, as shown clearly in Fig. 1. The outer end of the anchor section 6 is provided with a slot 7 for receiving the end of an ordinary screw-driver for facilitating the screwing and unscrewing of the anchor section within the shell 1.

The rubber section 5 acts to prevent slipping on a wet pavement, and as this section is made of rubber it will wear away faster than the hardened shell 1, consequently allowing the lower edge of the shell to bite or positively engage the surface, to prevent slipping or creeping whether the surface be ice-coated or wet with water.

It is to be noted that the anchor section is cylindrical in shape, and by being threaded throughout its length it can be easily screwed into position within the stem 3 and thence screwed into the registering threaded pocket 8 of the rubber section 5. There is an additional advantage to the lower or depending end of the anchor section 6 and that is when the lower edge of the body 2 has worn away to such an extent that it registers with the lower or inner depending end of anchor section 6, then there will be two bearing surfaces upon the pavement, in addition to the rubber section; to-wit: the lower edge of body 2 and the lower depending end of anchor section 6, which bearing surfaces will greatly increase the life of my calk.

While I have described the preferred embodiment of my invention, and have illustrated the same in the accompanying drawings, certain minor changes or alterations may appear to one skilled in the art to which this invention relates, during the extensive manufacture of the same, and I therefore reserve the right to make such alterations or changes as shall fairly fall within the scope of the appended claim.

What I claim is:

As a new article of manufacture, a calk comprising a shell including a body and a stem, said body provided with a recess and said stem being threaded throughout its internal length, a rubber section provided with a threaded pocket in the recess of said body, said threaded pocket registering with the threaded internal portion of said stem, and a cylindrical anchor section externally threaded throughout its entire length and positioned in the threaded stem and also in the threaded pocket of the rubber section, substantially as shown and described.

In testimony whereof I hereunto affix my signature.

OSCAR C. SANDERS.